US012117326B2

(12) United States Patent
Hofmeister et al.

(10) Patent No.: US 12,117,326 B2
(45) Date of Patent: Oct. 15, 2024

(54) FILLING DEVICE AND FILLING SYSTEM FOR VOLUMETRIC METERING OF POWDER

(71) Applicant: Harro Hoefliger Verpackungsmaschinen GmbH, Allmersbach im Tal (DE)

(72) Inventors: Jonas Hofmeister, Backnang (DE); Uwe Blum, Murrhardt (DE); Dieter Wurst, Murrhardt (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 0 days.

(21) Appl. No.: 18/151,277

(22) Filed: Jan. 6, 2023

(65) Prior Publication Data

US 2023/0234733 A1 Jul. 27, 2023

(30) Foreign Application Priority Data

Jan. 26, 2022 (EP) .................................... 22153514

(51) Int. Cl.
*B65B 1/16* (2006.01)
*B65B 1/36* (2006.01)
*G01F 11/00* (2006.01)
*G01F 13/00* (2006.01)

(52) U.S. Cl.
CPC .............. *G01F 11/003* (2013.01); *B65B 1/16* (2013.01); *B65B 1/36* (2013.01); *G01F 13/001* (2013.01)

(58) Field of Classification Search
CPC .... B65B 1/04; B65B 1/16; B65B 1/36; G01F 11/003; G01F 13/001
See application file for complete search history.

(56) References Cited

U.S. PATENT DOCUMENTS 3,195,786 A * 7/1965 Vogt .......................... B65B 1/16
222/394
5,598,876 A * 2/1997 Zanini ....................... B65B 1/16
141/93

(Continued)

FOREIGN PATENT DOCUMENTS

DE 10 2005 037 916 A1 5/2006
EP 2 195 244 B1 3/2012

*Primary Examiner* — Nicolas A Arnett
(74) *Attorney, Agent, or Firm* — Walter Ottesen, P.A.

(57) ABSTRACT

The disclosure relates to a filling device and to a filling system for volumetric metering of powder in a metering container. The filling device includes a retaining device permeable to air but impermeable to the powder. The retaining device in the course of the metering process covers a filling aperture of the metering container and a rim of the metering container encircling the filling aperture, a filling pipe which has been passed through the retaining device into the metering container, and first underpressure generator for generating an underpressure or partial vacuum on the retaining device on the side thereof facing away from the metering container. The filling pipe exhibits a blocking portion, the blocking portion being at least partially permeable to air but impermeable to the powder. The filling device includes a second underpressure generator for generating an underpressure on the blocking portion on the outside thereof.

11 Claims, 2 Drawing Sheets

(56) References Cited

U.S. PATENT DOCUMENTS

| | | | | |
|---|---|---|---|---|
| 6,340,036 B1* | 1/2002 | Toyoizumi | ............... | B65B 1/12 |
| | | | | 141/67 |
| 6,497,259 B1* | 12/2002 | Wegman | .................. | B65B 1/12 |
| | | | | 141/286 |
| 6,640,845 B1* | 11/2003 | Wegman | .................. | B65B 1/12 |
| | | | | 141/90 |
| 6,722,406 B2* | 4/2004 | Wegman | ............ | G03G 15/0877 |
| | | | | 141/311 A |
| 7,004,210 B1* | 2/2006 | Wegman | .................. | B65B 1/12 |
| | | | | 141/73 |
| 7,980,277 B2* | 7/2011 | Amano | .................... | B65B 1/32 |
| | | | | 141/286 |
| 8,371,342 B2* | 2/2013 | Weigel | ..................... | B65B 1/16 |
| | | | | 141/242 |
| 9,642,812 B2* | 5/2017 | Penachio | .................. | B65B 1/36 |
| 11,286,071 B2* | 3/2022 | Rapparini | ................. | B65B 1/40 |
| 11,801,950 B2* | 10/2023 | Rapparini | ................. | B65B 1/42 |
| 2004/0050448 A1* | 3/2004 | Wegman | .................. | B65B 1/12 |
| | | | | 141/67 |
| 2007/0294982 A1* | 12/2007 | Knoke | ................ | B65B 43/465 |
| | | | | 53/451 |
| 2010/0212777 A1* | 8/2010 | Weigel | ..................... | B65B 1/16 |
| | | | | 141/94 |

* cited by examiner

FILLING DEVICE AND FILLING SYSTEM FOR VOLUMETRIC METERING OF POWDER

CROSS-REFERENCE TO RELATED APPLICATIONS

This application claims priority of European patent application no. 22153514.9, filed Jan. 26, 2022, the entire content of which is incorporated herein by reference.

TECHNICAL FIELD

The disclosure relates to a filling device for volumetric metering of powder and also to a filling system with such a filling device and with a metering container.

BACKGROUND

Powdery products are frequently divided up into individual quantities predetermined for use, and packaged. For the measurement of such individual quantities, volumetric metering is widely carried out, for which purpose roller metering devices or slide metering devices may come into operation.

For the volumetric metering of small quantities of powder—in particular, small quantities of powdery medicament—a filling device in the form of a diaphragm filler with a metering container is known from US 2010/0212777, in which a planar diaphragm that is permeable to air but impermeable to the powder covers a filling aperture and a rim of the metering container. A filling pipe has been passed through the diaphragm and leads into the interior space of the metering container. In the course of the metering process, an underpressure is applied to the outside of the diaphragm. By this means, the air located in the container is drawn off by suction, and powder is simultaneously sucked through the filling pipe into the interior space of the container. The diaphragm retains the powder in the container, so that a filling to the brim can be carried out.

The aforementioned form of diaphragm metering has proved effective in the case of small filling quantities of fine powders having a pronounced tendency toward adhesion. In practice, individual quantities with a volume of, for instance, 20 $mm^3$ are measured in this case, in which case filling pipes with a clear pipe diameter of, for instance, 1.6 mm come into operation. However, for the metering of larger and coarser, less adhesive quantities of powder, diaphragm metering in the known form has turned out to be unsuitable, since the flow of powder could not be controlled sufficiently precisely in such cases.

SUMMARY

It is an object of the disclosure to develop a filling device in such a manner that larger quantities of readily free-flowing powder can also be metered exactly.

This object is, for example, achieved by a filling device for volumetric metering of a powder in a metering container. The filling device includes: a retaining device permeable to air and impermeable to the powder; the retaining device being configured to, in a course of a metering process, cover a filling aperture of the metering container and a rim of the metering container encircling the filling aperture; a filling pipe which passes through the retaining device and being configured to lead into an interior space of the metering container when the metering container is being filled; a first underpressure or partial vacuum generator configured to generate an underpressure on the retaining device on a side of the retaining device facing away from the metering container; the filling pipe having a blocking portion configured to be at least partially permeable to air and impermeable to the powder; the blocking portion defining an exterior; and, the filling device including a second underpressure or partial vacuum generator configured to generate an underpressure at the blocking portion on said exterior.

The object further underlying the disclosure is to specify a filling system for the metering also of larger quantities of powder.

This object is, for example, achieved by a filling system for volumetric metering of powder. The filling system includes: a metering container defining an interior space and having a rim encircling a filling aperture of the metering container; a filling device having a retaining device, a filling pipe, and a first underpressure generator; the retaining device being permeable to air and impermeable to the powder; the retaining device being configured to, in a course of a metering process, cover the filling aperture of the metering container and the rim of the metering container; the filling pipe passing through the retaining device and being configured to lead into the interior space of the metering container when the metering container is being filled; the first underpressure generator being configured to generate an underpressure on the retaining device on a side of the retaining device facing away from the metering container; the filling pipe having a blocking portion configured to be at least partially permeable to air and impermeable to the powder; the blocking portion defining an exterior; and, the filling device including a second underpressure generator configured to generate an underpressure at the blocking portion on the exterior.

In accordance with the disclosure, a filling device with a semipermeable—that is, permeable to air but impermeable to the powder-retaining device has been provided which in the course of the metering process covers the filling aperture of the metering container and the rim of the metering container encircling the filling aperture, wherein a first underpressure generator or means for generating an underpressure on the retaining device have been provided on the side thereof facing away from the metering container. A filling pipe, which has been passed through the retaining device, leads into the interior space of the metering container in the course of the filling of the metering container. The filling pipe exhibits a blocking portion, the blocking portion of the filling pipe having been constructed to be at least partially permeable to air but impermeable to the powder. The filling device includes, in addition, a second underpressure generator or means for generating an underpressure on the blocking portion on the outside thereof. In another aspect of the disclosure, a filling system has been provided that includes the aforementioned filling device and also an associated metering container. The filling device brings about the initiation and the stopping of the flow of powder. By virtue of its volume, the metering container presets the quantity or volume of the powder to be measured.

The disclosure is based on the insight that larger and coarser quantities of powder can be metered reliably when, in addition to the precise filling of the metering container, an exact control of the flow of powder through the filling pipe is possible subsequent to the actual filling and metering process. For in the case of larger pipe cross-sections it has been shown that the flow of powder, once set in motion, cannot simply be stopped by the reduced pressure on the semipermeable retaining device being deactivated. Rather, the powder has a tendency to continue trickling, this being favored not only by large pipe cross-sections but also by types of powder having a low adhesion tendency, and impairing or even nullifying the result of metering without further measures.

So, in accordance with the disclosure, the metering container is firstly filled with the desired target volume by application of reduced pressure to the semipermeable retaining device. After this has been done, the blocking portion of the filling pipe comes into operation. Just like the retaining device, this blocking portion has been constructed to be semipermeable—that is, at least partially permeable to air but impermeable to the powder. Reduced pressure is now applied to the outside of the blocking portion, which continues through the semipermeable material inward into the filling pipe and acts there on the powder located therein. The reduced pressure inhibits the free-flowing capacity of the powder and in the region of the blocking portion generates a plug of powder which clogs up the filling pipe. The filled metering container can now be separated from the filling device, without powder continuing to trickle through the filling pipe into the metering container. The volumetric quantity of the measured powder, preset by the volume of the metering container, remains unchanged and can no longer be falsified retrospectively. It has been shown that, by virtue of the semipermeable blocking portion subjected to reduced pressure, a precise and reproducible control of the flow of powder is possible, particularly when larger quantities of powder have to be metered using larger filling-pipe cross-sections. In practice, the metering of powdery detergent, for instance, in individual quantities of 20,000 mm$^3$ is possible using filling pipes with a clear pipe diameter from 8 mm to 10 mm.

For the generation of the blocking plug of powder, it may be sufficient that in the blocking portion the filling pipe has been provided with a window, for instance, which has been filled with the semipermeable material. In a preferred embodiment, the blocking portion has been constructed to be permeable to air along its entire periphery but impermeable to the powder, the second underpressure means including a second underpressure chamber surrounding the blocking portion in the form of a ring. By this means, the reduced pressure acts around the whole periphery of the blocking portion on the powder located inside the filling pipe. Even with small differences in pressure, a reliable blocking action can be brought about in this way.

It may be expedient to form the blocking portion from, for instance, a thin, pliable diaphragm that is kept in shape by a supporting grating or such like. The blocking portion has advantageously been formed from a rigid, porous material, in particular from bonded metal particles. The term "rigid" here means that the material withstands the difference in pressure applied during operation by itself—that is, in self-supporting manner-without the cross-section of the blocking portion collapsing. Rather, the filling pipe retains its structurally preset cross-section even under fluctuating pressure conditions, so that a precisely reproducible flow of powder as well as a reliable blocking action can be obtained.

Depending upon the application, configuring the terminal orifice portion of the filling pipe as a blocking portion may enter into consideration. But in practice it has been shown that the reduced pressure introduced by virtue of the blocking portion continues in the powder beyond the boundaries of the blocking portion and, in conjunction with the aforementioned configuration, provides for deposits on the other side of the pipe orifice. In order to avoid a situation where such deposits are generated and are removed from the metering container once filling thereof has taken place, in a preferred embodiment an orifice portion of the filling pipe extends between the free end and the blocking portion, the orifice portion being impermeable to air. By adaptation of the length of the orifice portion, the boundary of the blocking deposit of powder can be placed precisely at the free end or—to be more exact—at the outlet aperture of the filling pipe. In an expedient embodiment, for this purpose the air-impermeable orifice portion is constituted by, in particular, an interchangeable plug-in sleeve, favoring an exact adaptation of the length of the orifice portion and, in addition, simplifying a conversion of the filling device to various types of powder by interchange of the plug-in sleeves. With the precise positioning of the boundary of the deposit of powder that is achieved, it can be ensured that, on the one hand, no powder continues to trickle out of the filling pipe in the course of separating the metering container and the filling device, and that, on the other hand, no powder is withdrawn from the filled metering container as a result of the separation process.

It may be expedient to arrange the retaining device only on one side relative to the filling pipe. Preferably, however, the retaining device extends in closed form around the filling pipe, the first underpressure device for generating the reduced pressure on the retaining device including a first underpressure chamber extending around the filling pipe in a manner corresponding to the retaining device. By this means, a quasi-coaxial and compact form of construction arises which combines an underpresssure distribution that is as uniform as possible, and hence a filling of the metering container that is as uniform as possible, with a reliable blocking action in the filling pipe. In addition, several filling devices can be positioned close to one another in this way, favoring simultaneous metering at several places.

A semipermeable diaphragm may also come into operation in the retaining device. Preferably, however, the retaining device—just like the blocking portion—has been formed from a rigid, porous material, in particular from bonded metal particles. By this means, it is ensured-without additional supporting measures—that the retaining device is not sucked into the metering container by virtue of the prevailing difference in pressure. Rather, the retaining device is rigid to the extent that a structurally preset metering volume of the metering container is maintained under fluctuating pressure conditions while complying with low tolerances, so that a high metering accuracy results, even in the case of large container dimensions.

BRIEF DESCRIPTION OF DRAWINGS

The invention will now be described with reference to the drawings wherein.

DETAILED DESCRIPTION

Figure 1:
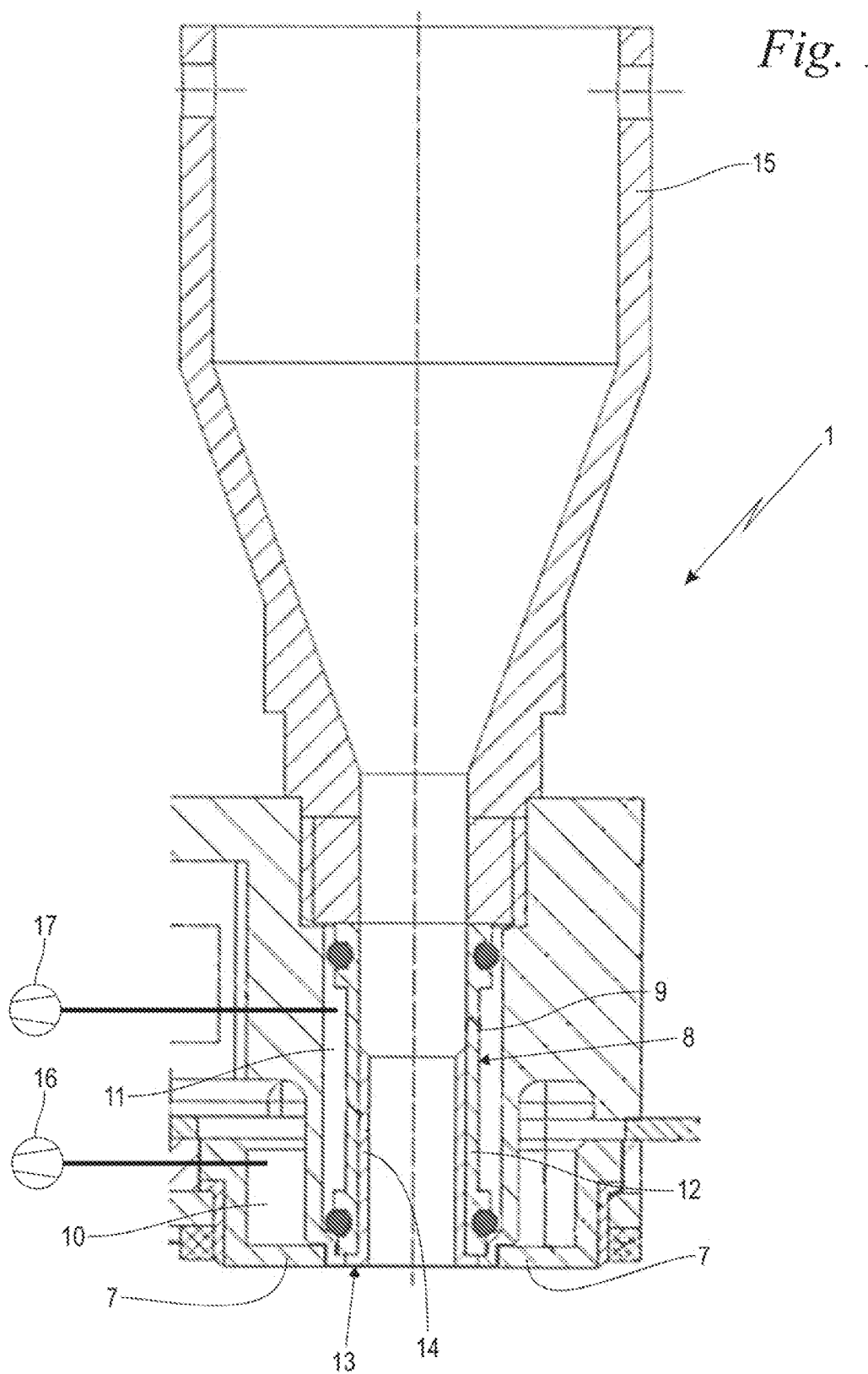
FIG. 1 shows, in a schematic longitudinal-section representation, a filling device according to the disclosure with a semipermeable retaining device for powder, with a filling pipe that has been passed through the retaining device, with an underpressure or partial vacuum chamber arranged on the outside of the diaphragm, and with an underpressure-controlled or partial vacuum blocking portion of the filling pipe; and, FIG. 2 shows, in a schematic longitudinal-section representation, the filling system according to the disclosure with a filling device according to FIG. 1 and with a metering container located underneath.
Figure 2:
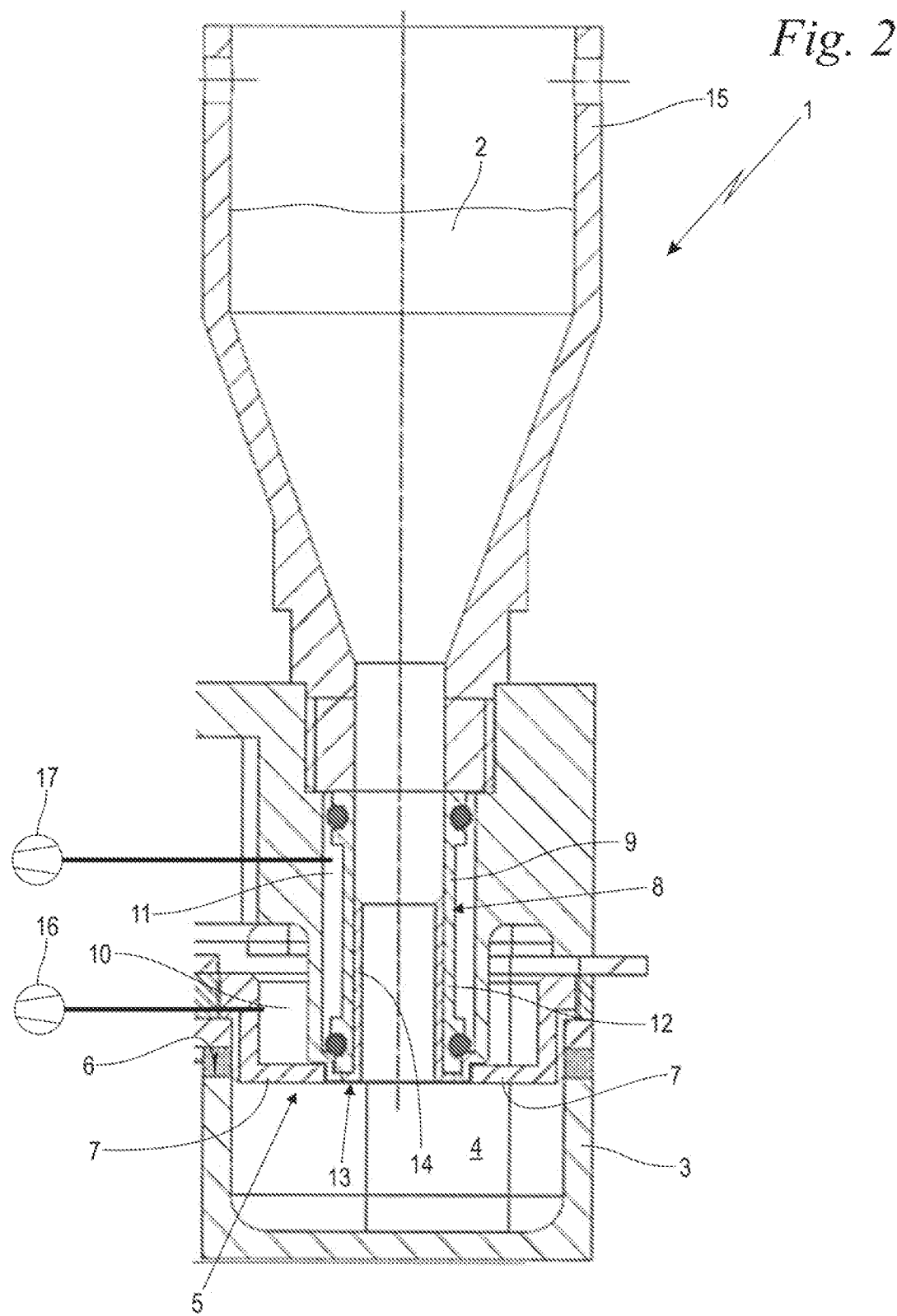

FIG. 1 shows, in a schematic longitudinal-section representation, a filling device 1 according to the disclosure for volumetric metering of powder 2 (FIG. 2). In the embodiment shown, the powder 2 is a powdery detergent. But any other powders 2—such as ground coffee, flour or such like—can be metered with the filling device 1. The term "powder" chosen here encompasses, quite generally, free-flowing materials including those with coarser granulation, such as salt, sugar, but also seeds or such like. In the embodiment shown, powdery detergent with a target volume of about 20,000 mm$^3$ is to be metered. But the disclosure also permits larger or smaller target volumes.

The filling device 1 includes a funnel-shaped storage container 15 in which a supply of the powder 2 has been made available. Furthermore, the filling device 1 includes a partially permeable—namely permeable to air but impermeable to the powder 2—retaining device 7 and also a filling pipe 8 which at its upper end leads into the storage container 15 and which in the region of its opposing, lower and free end has been passed through the retaining device 7. The filling pipe 8 has a clear pipe diameter of about 8 mm. But within the scope of the disclosure larger or smaller pipe diameters are also capable of being realized. The retaining device 7 may be a screen, a grating, a diaphragm or such like and, in the embodiment shown, is a rigid, self-supporting molded part made of a rigid, porous material, corresponding to the schematic longitudinal-section representation. The retaining device 7 extends in closed form around the filling pipe 8.

The filling device 1 includes, as a further part, a first underpressure generator or means for generating an underpressure on the same side of the retaining device 7 on which the filling pipe 8 from the storage container 15 has been led up to the retaining device 7. In the metering mode according to FIG. 2, this side is, in addition, the side of the retaining device 7 facing away from the metering container 3. The first underpressure means include a first underpressure chamber 10 which is delimited in the downward direction by the retaining device 7. In the embodiment shown, the first underpressure chamber 10 extends around the filling pipe 8 in a manner corresponding to the retaining device 7 and has been formed in the molded part of the retaining device 7. The first underpressure chamber 10 is connected—as represented here only schematically—to a first underpressure source 16 and can—fed by the source—be subjected to reduced pressure in a controlled manner as required.

The filling pipe 8 exhibits a blocking portion 9, the blocking portion 9 having been constructed, in a manner analogous to the retaining device 7, to be at least partially permeable to air but impermeable to the powder 2. Matching this, the filling device 1 includes a second underpressure generator or means for generating an underpressure on the blocking portion 9 on the outside thereof. Part of the second underpressure means is a second underpressure chamber 11 which on the outside adjoins the material of the blocking portion 9. The second underpressure chamber 11 is connected—as represented here only schematically—to a second underpressure source 17 and can—fed by the source—be subjected to an underpressure in a controlled manner as required. Instead of two underpressure sources 16, 17, a common underpressure source may also be expedient. In any case, a controller, not represented in any detail, is present, with which the two underpressure chambers 10, 11 can be subjected to reduced pressure independently of one another.

In the embodiment shown, the blocking portion 9 has been constructed to be permeable to air along its entire periphery but impermeable to the powder 2. Corresponding to this, the second underpressure chamber 11 surrounds the blocking portion 9 in the form of a ring. Coaxially with this, the first underpressure chamber 10 surrounds the second underpressure chamber 11. The blocking portion 9 is constituted by a rigid, self-supporting molded body and for this purpose has been manufactured from a rigid, porous material. This is the same material as the material of the retaining device 7, namely a porous substance consisting of bonded metal particles, which is available under the trade name ALWA POR. But other suitable materials may also be employed, including sintered metal parts, milled parts, 3D printed parts and such like.

The filling pipe 8 exhibits a free end 13 which in the course of the filling process (FIG. 2) faces toward the metering container 3 and forms there the orifice of the filling pipe 8 into the metering container 3. An orifice portion 12 of the filling pipe 8 extends between the free end 13 and the blocking portion 9. Unlike the blocking portion 9, the orifice portion 12 is impermeable to air. The orifice portion 12 may be constituted by a length of tubing which adjoins the porous blocking portion 9. In the embodiment shown, the porous molded part—which also, but not only, forms the blocking portion 9—extends as far as the free end 13 and, adjoining the free end 13, is lined with an air-impermeable plug-in sleeve 14 for the purpose of forming the impermeable orifice portion 12. Where necessary, the plug-in sleeve 14 can be pulled out, adapted in length, and re-inserted. In addition, an interchange of individual plug-in sleeves 14 enters into consideration for the purpose of adaptation to various types of powder.

FIG. 2 shows, in a longitudinal-section representation, a filling system according to the disclosure, which includes the filling device 1 according to FIG. 1 and also a metering container 3. The arrangement shown has been provided for simultaneous volumetric metering of the powder 2 and for filling the metering container 3. In the embodiment shown, the metering container 3 is a storage container provided for later sealing, but it may also be an intermediate container or a transfer container. The metering container 3 exhibits an interior space 4, provided for receiving the powder 2, a filling aperture 5, open on one side in the upward direction, and also a rim 6 encircling the filling aperture 5.

In the course of the filling of the metering container 3, the filling device 1 is seated on top of the metering container 3, corresponding to the representation according to FIG. 2. The retaining device 7 covers both the filling aperture 5 and the encircling rim 6 of the metering container 3. The retaining device 7 has been pressed against the rim 6 of the metering container 3 in encircling and sealing manner. The filling pipe 8 which has been passed through the retaining device 7 leads into the interior space 4 of the metering container 3. The first underpressure chamber 10 is situated on the side of the retaining device 7 facing away from the metering container 3.

In ordinary operation, atmospheric pressure prevails in the region of the storage container 15, whereas in the course of an ongoing metering and filling process the first underpressure chamber 10 is subjected to reduced pressure by the underpressure source 16. The second underpressure chamber 11 remains inactive at first—that is, it is not subjected to reduced pressure by its associated underpressure source 17. As a consequence of the difference in pressure arising between the storage container 15 and the first underpressure chamber 10, a current of air arises which leads out of the interior space 4 of the metering container 3 through the retaining device 7 into the first underpressure chamber 10. On the inlet side, this current of air is drawn out of the storage container 15 by suction through the filling pipe 8, in the course of which the powder 2 is entrained out of the storage container 15 through the filling pipe 8 into the interior space 4 of the metering container 3. The previously described properties of the retaining device 7, as being permeable to air but impermeable to the powder 2, have the effect that, although the air drawn off by suction can be sucked through the retaining device 7, the particles of the powder 2 are retained on the retaining device 7. Since the retaining device 7 is flowed through over the entire area of the filling aperture 5, the powder 2 is distributed in the entire interior space 4 of the metering container 3 until a gap-free filling of the interior space 4 to the brim has been obtained.

The metering container 3 presets a volume that is delimited by its walls and its bottom and also by the area of the retaining device 7 resting on the rim 6. The gap-free filling of the interior space 4 to the brim generates the desired volumetric dimension of an individual quantity of the powder 2 with precisely the aforementioned volume of the metering container 3. In the embodiment shown, the overlying surface 20 of the retaining device 7 has been constructed to be flat. A volume adaptation can be carried out by a different retaining device 7 with a differently shaped—for instance, concave or convex—top surface being employed.

After completion of the aforementioned method step, the first underpressure chamber 10 is subjected to atmospheric pressure. Preparations are now made in order to be able to remove the filling device 1 with its retaining device 7 from the metering container 3. For this purpose, the second underpressure chamber 11 is subjected to reduced pressure by the second underpressure source 17. The reduced pressure continues through the semipermeable material of the blocking portion 9 into the interior of the filling pipe 8, though the powder 2 located therein is retained in the filling pipe 8 by the aforementioned material of the blocking portion and does not get into the second underpressure chamber 11. As a consequence of the reduced pressure, the powder 2 in the blocking portion 9 is compressed into the orifice portion 12 in such a manner that a non-free-flowing plug of powder arises, sealing the filling pipe 8. The length of the orifice portion 12, or of the plug-in sleeve, has been matched in such a manner to the acting reduced pressure and to the properties of the powder to be metered that the lower boundary of the plug of powder coincides as exactly as possible with the free end 13 of the filling pipe 8.

In the aforementioned state, the reduced pressure of the first underpressure chamber 10 can now be deactivated. The filling device 1 and the metering container 3 can be separated from one another without powder 2 continuing to trickle out of the filling pipe 8 and without powder 2 being drawn out of the interior space 4 of the metering container 3 by suction and entrained. The metered quantity of the powder 2 already measured is accordingly not subsequently falsified by the process of separation of the filling device 1 and the metering container 3. Immediately after this, the encircling rim 6 of the metering container 3 can be sealed off with a sealing film by gluing or heat-sealing. A sealed storage container has then been formed which has been made ready for storage and utilization by the end user without further intermediate steps.

The arrangement according to the disclosure has been represented here by way of an example of a single filling device 1 in interaction with a single metering container 3. But it is readily possible, by reason of the compact form of construction, to arrange several such filling systems in a row or even in a matrix for simultaneous operation.

In practical operation, it cannot be ruled out that the pores of the retaining device 7 and/or of the blocking portion 9 gradually become clogged with powder particles. It may therefore be expedient to provide, in addition to the underpressure sources 16, 17 shown, also excess-pressure sources, not represented, via which the flow through the retaining device 7 and/or the blocking portion 9 can be reversed as required, so that the clogged pores are blown free.

It is understood that the foregoing description is that of the preferred embodiments of the invention and that various changes and modifications may be made thereto without departing from the spirit and scope of the invention as defined in the appended claims.

The invention claimed is:

1. A filling device for volumetric metering of a powder in a metering container, the filling device comprising:
a retaining device permeable to air and impermeable to the powder;
said retaining device being configured to, in a course of a metering process, cover a filling aperture of the metering container and a rim of the metering container encircling the filling aperture;
a filling pipe which passes through said retaining device and being configured to lead into an interior space of the metering container when the metering container is being filled;
a first underpressure generator configured to generate an underpressure on said retaining device on a side of said retaining device facing away from the metering container;
said filling pipe having a blocking portion configured to be at least partially permeable to air and impermeable to the powder;
said blocking portion defining an exterior; and,
said filling device including a second underpressure generator configured to generate an underpressure at said blocking portion on said exterior.

2. The filling device of claim 1, wherein said blocking portion defines a periphery and is configured to be permeable to air and impermeable to the powder along an entirety of said periphery; and, said second underpressure generator includes a second underpressure chamber surrounding said blocking portion in a form of a ring.

3. The filling device of claim 1, wherein said blocking portion has been formed from a rigid, porous material.

4. The filling device of claim 1, wherein said blocking portion has been formed from bonded metal particles.

5. The filling device of claim 1, wherein said filling pipe has a free end facing toward the metering container in the course of the filling process; said filling pipe defines an orifice portion extending between said free end and said blocking portion; and, said orifice portion is impermeable to air.

6. The filling device of claim 5, wherein said air-impermeable orifice portion is formed by a plug-in sleeve.

7. The filling device of claim 6, wherein said plug-in sleeve is interchangeable.

8. The filling device of claim 1, wherein said retaining device extends in closed form around said filling pipe; and, said first underpressure generator includes a first underpressure chamber extending around said filling pipe in a manner corresponding to said retaining device.

9. The filling device of claim 1, wherein said retaining device has been formed from a rigid, porous material.

10. The filling device of claim 9, wherein the rigid porous material has been formed from bonded metal particles.

11. A filling system for volumetric metering of powder, the filling system comprising:

a metering container defining an interior space and having a rim encircling a filling aperture of said metering container;
a filling device having a retaining device, a filling pipe, and a first underpressure generator;
said retaining device being permeable to air and impermeable to the powder;
said retaining device being configured to, in a course of a metering process, cover said filling aperture of said metering container and said rim of said metering container;
said filling pipe passing through said retaining device and being configured to lead into said interior space of said metering container when said metering container is being filled;
said first underpressure generator being configured to generate an underpressure on said retaining device on a side of said retaining device facing away from the metering container;
said filling pipe having a blocking portion configured to be at least partially permeable to air and impermeable to the powder;
said blocking portion defining an exterior; and,
said filling device including a second underpressure generator configured to generate an underpressure at said blocking portion on said exterior.

* * * * *